No. 765,366. PATENTED JULY 19, 1904.
J. H. MONBEIG & P. FORSANS.
PILLOW OR BUSH FOR THE AXLES OF VEHICLES OR OTHER PURPOSES.
APPLICATION FILED JULY 8, 1902.
NO MODEL.

WITNESSES
INVENTORS
ATTORNEYS

No. 765,366. Patented July 19, 1904.

UNITED STATES PATENT OFFICE.

JULIEN HENRI MONBEIG, OF CARESSE, AND PIERRE FORSANS, OF BIARRITZ, FRANCE.

PILLOW OR BUSH FOR THE AXLES OF VEHICLES OR OTHER PURPOSES.

SPECIFICATION forming part of Letters Patent No. 765,366, dated July 19, 1904.

Application filed July 8, 1902. Serial No. 114,832. (No model.)

*To all whom it may concern:*

Be it known that we, JULIEN HENRI MONBEIG, residing at Caresse, and PIERRE FORSANS, residing at Biarritz, Basses-Pyrénées, in the Republic of France, citizens of the Republic of France, have invented a certain new and useful Improved Pillow or Bush for the Axles of Vehicles or other Purposes, of which the following is a specification.

This invention relates to a pillow or bush for rotatory shafts or axle-journals; and the object thereof is to provide a bearing-block on the internal surface of which, in contact with the axle, a cavity or recess is formed of smaller length and width than the bearing-block, the latter being connected with a small oil-pump which sucks oil from a vessel and delivers it into the said cavity in such a manner as to equilibrate the pressure which the block and shaft exert on each other to force the oil to pass continuously between the shaft and the bearing parts of the block and to thus considerably reduce the friction and wear of the latter. This bearing-block is more particularly adapted to be used in connection with railway-cars and similar vehicles. For this purpose the pump is automatically controlled by the displacement of the spring-carried frame of the vehicle by the action of the roughness of the track. It will be sufficient to fix the pump-casing to the pillow and the pump-piston to the frame.

Figure 1:
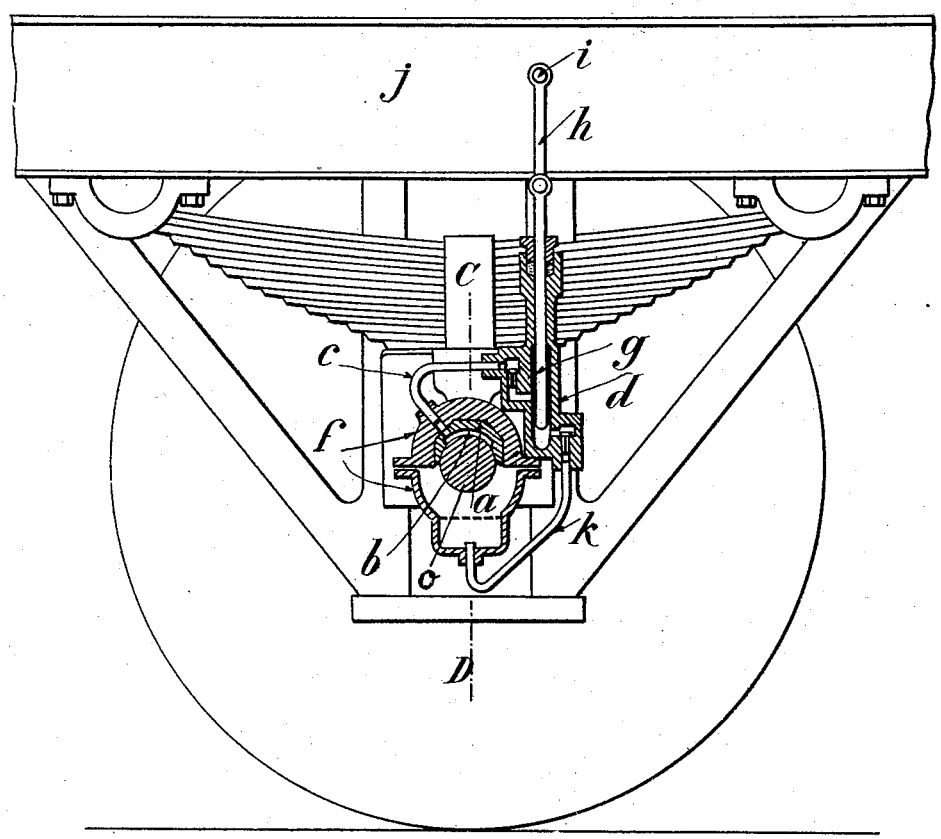
Figure 2:
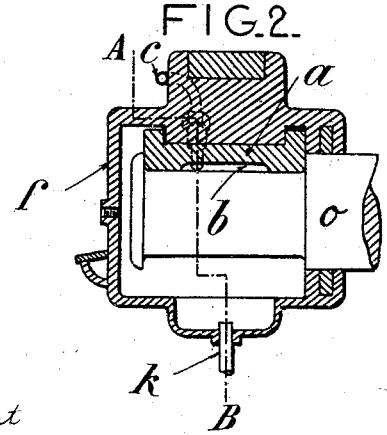

In the accompanying drawings, Figure 1 is an elevation sectional view of the improved pillow or bush as applied to a railway-car, the section being taken on line A B of Fig. 2. Fig. 2 is a longitudinal section of the pillow or bush, taken through C D of Fig. 1.

Referring to the drawings, it may be seen that the invention consists in providing in the bearing-block $a$ an internal cavity $b$, closed on all sides and communicating, by means of a pipe $c$, with the delivery-orifice of a pump, the piston of which is connected to the frame of the railway-car or the like. The pump-casing $d$ is fixed to the oil vessel $f$ and the small plunger-piston $g$ is connected by a connecting-rod $h$ to a pivot $i$, fixed to the frame $j$ of the case. The suction-pipe $k$ connects the pump-casing $d$ with the bottom of the oil vessel $f$.

It will be understood that the pump will be continuously operated by the vertical movements of the vehicle-frame produced by the unevenness of the track and that it will continuously deliver oil to the recess $b$ in the block. The pressure in the said recess will therefore increase until it completely balances the weight bearing through the block $a$ on the axle $o$, and the superfluous oil will therefore escape between the block and the axle and return to the oil vessel. Under these conditions the friction arising from the weight is nearly totally removed, since a sheet or layer of oil is continuously interposed between the metal parts of the block and the axle, so that the rotary part slides on a kind of liquid surface, and the wear on the bearings is considerably reduced. Moreover, since the operation of the pump offers a continuous resistance to the vertical displacement of the frame the shaking and vibration of traveling are reduced to a great extent.

Having now described our invention, what we claim as new, and desire to secure by Letters Patent, is—

1. A pillow or bush for railway-cars or the like, comprising a bearing-block $a$ in contact with the axle-journal and provided on its inner surface with a recess $b$ of smaller length and width than said block so as to form a chamber between the axle-journal and the block in combination with a pipe $c$ leading into the recess $b$ of said block $a$ and a pump-cylinder $d$ with a plunger-piston $g$ and operating means therefor adapted to force oil under pressure through said pipe $c$ into said recess $b$ of said block $a$ substantially as and for the purpose set forth.

2. A pillow or bush for railway-cars or the like, comprising a bearing-block $a$ in contact with the axle-journal and provided on its inner surface with a recess $b$ of smaller length and width than said block, in combination with a pipe $c$ leading into the recess $b$ of said block $a$, an oil vessel $f$ secured to the block, a pump-cylinder $d$ fixed to the oil vessel, a plunger-piston $g$ operating in said pump $d$ and adapted to force oil under pressure through pipe $c$ into the recess $b$ of the block $a$, a suction-pipe $k$ connecting the pump $d$ with the oil vessel and a connecting-rod $h$ pivoted by one end to the piston $g$ and by the other end to the frame $j$ of the vehicle substantially as and for the purpose set forth.

In witness whereof we have hereunto set our hands in presence of two witnesses.

JULIEN HENRI MONBEIG.
PIERRE FORSANS.

Witnesses:
J. MORRIS POST,
CASONIORY.